United States Patent [19]

Johanson

[11] 4,179,722
[45] Dec. 18, 1979

[54] SEALED TUNABLE CAPACITOR

[75] Inventor: John E. Johanson, Boonton, N.J.

[73] Assignee: Johanson Manufacturing Corporation, Boonton, N.J.

[21] Appl. No.: 934,357

[22] Filed: Aug. 17, 1978

[51] Int. Cl.² ............................................. H01G 5/06
[52] U.S. Cl. .................................... 361/293; 361/292
[58] Field of Search ...................... 361/293, 292, 299

[56] References Cited

U.S. PATENT DOCUMENTS

| | | | |
|---|---|---|---|
| 3,209,219 | 9/1965 | Masui | 361/293 X |
| 3,486,089 | 12/1969 | Wambach | 361/293 |
| 3,701,932 | 10/1972 | Johanson | 361/299 |
| 4,095,263 | 6/1978 | Johanson | 361/292 |

*Primary Examiner*—E. A. Goldberg
*Attorney, Agent, or Firm*—James J. Cannon, Jr.; James J. Cannon

[57] ABSTRACT

A sealed tunable capacitor in which a capacitor assembly of metallized stator discs having a rotor plate sandwiched therebetween, said rotor plate having a post portion extending upwardly and downwardly for rotative movement thereof within central openings in said discs and said rotor post portion having a recess adapted to receive a tuning tool, is contained within a sealed plastic housing such that said rotor tuning post recess is frictionally fitted within an opening in said housing and is accessible from the exterior of said housing and said housing includes a base member frictionally fitted to retain said capacitor assembly within said housing, the leads of said capacitor assembly sealed within slots in said housing base, by frictional fitting or an adhesive or both and said housing base further sealed by a coating of an epoxy adhesive to prevent the penetration of contaminants into said capacitor assembly.

6 Claims, 3 Drawing Figures

SEALED TUNABLE CAPACITOR

BACKGROUND OF THE INVENTION

1. Field of the Invention

This invention relates to tunable, variable or adjustable capacitors and is directed particularly to improvements in the structure of tunable capacitors whereby the capacitor is fully sealed against the penetration of gases, dust or other contaminants and yet is tunable over its entire range from the exterior of its package without breaking or otherwise impairing the effectiveness of the seal.

2. Description of the Prior Art

This invention is primarily an improvement of the structure or housing of the variable disc capacitor taught by U.S. Pat. No. 3,701,932 issued in the same inventor. It also relates in general to U.S. Pat. No. 4,095,263 issued to the same inventor.

In the present invention, the capacitor of U.S. Pat. No. 3,701,932 has been miniaturized and redesigned in its structure to fit into a sealed housing. It shares many of the design improvements of the capacitor disclosed in U.S. Pat. No. 4,095,263 except for the construction of the sealed housing.

The principle object of the present invention is to provide a miniature tunable or variable capacitor which is fully enclosed within a sealed housing such that air, gases, moisture, dust, or other contaminants cannot enter or penetrate the sealed package, while at the same time to provide a variable capacitor which is tunable over its entire range from outside the sealed package without breaking the seal or otherwise impairing its effectiveness.

A second object of this invention is to provide a compact, tunable capacitor which is stable in performance with respect to temperature changes, physical shock and other environmental factors.

Another object of this invention is to provide a miniature ceramic disc capacitor with these features which is easily tunable with a square tuning tool made of a dielectric material so as not to introduce strays into the circuit while tuning.

SUMMARY OF THE INVENTION

The sealed tunable capacitor of the present invention includes a housing having two parts, the first part being an inverted open cylindrical structure having a top and cylindrical sides with a centrally disposed circular opening in the top. The other part of the housing is a base member of generally circular shape which is friction fitted within the base opening of the cylindrical wall of the upper housing member. The base member of the housing has two diametrically opposed small rectangular portions of its perimeter cut away to permit the stator and rotor leads to protrude outside the housing itself. The housing is made of a slightly flexible plastic material such as Delrin (Trademark). The sealed tunable capacitor as a unit has a circular, insulating base member, a first stator ceramic disc having a deposition of a conductive material such as a metallic layer on its lower side positioned over said base member, a semi-circular rotor member, and a second stator disc having a similar metallic layer on its upper side, all retained in a stacked relation and held in position by spring clamps, one of said clamps being an upward vertical extension of said stator lead and the other being an upward extension of said rotor lead, the entire capacitor assembly fitting within the upper cylindrical housing member. The rotor member is a thin semi-circular metallic plate having a central concentric cylindrical post portion, the upper end of which is provided with a square adjusting hole or recess. The lower end of the rotor post portion is formed with a concentric circular recess. The ceramic dielectric stator discs are provided with round central openings for the sliding reception of the upper and lower ends of the rotor post portion. The inner diameter of the stator discs must be greater than the diameter of the rotor post portion so that the stators will be insulated from the rotor. A first spring clamp electrode serves not only to clamp the disc-like parts of the tunable capacitor together, but also to electrically interconnect the stators together to act as a single stator between which is sandwiched the semi-circular rotor member. The first spring clamp member is integrally formed with upper clamp finger portions extending into a bifurcated portion, a central vertical portion, a base portion, and an offset leg portion extending downward from said base portion. The finger portions are bent downwards to provide a spring clamp. A second spring clamp electrode also serves to resiliently clamp the disc-like parts of the tunable capacitor together at a diametrically opposite side thereof from said first spring clamp. This second electrode clamp has a flat base portion formed with a pair of central inwardly extending spring fingers terminating in upwardly and outwardly extending brush contacts which project upwardly and outwardly into the central recess of the lower rotor post portion to make electrical contact therewith. The outer ends of the base portion are integrally formed with a vertical portion, bent spring finger portions and a central downwardly and outwardly extending leg portion. The rotor, ceramic stator discs and spring clamp members form the basic tunable capacitor assembly and may be made in any of a plurality of known means including those disclosed in U.S. Pat. Nos. 3,701,932 and 4,095,263.

The novelty of the present invention lies in the means of sealing the tunable capacitor within its semi-rigid plastic housing members. The upper housing member is cylindrically shaped having integrally formed top and side walls and an open base. The top of the upper housing member has a centrally located circular opening having a diameter slightly less than the outer diameter of the upper post portion of the rotor. The upper post portion of the rotor is friction fitted into this opening such that its top is slightly recessed within the top of the upper housing member, thereby forming an airtight seal around the rotor post while still permitting the tuning tool to be inserted in the upper square recess of the rotor post. The base of the housing is a circular, washer-type member having an outer diameter slightly greater than inner diameter of the base of the cylindrical upper housing member. It also has two small diametrically opposed rectangular portions cut-away at its perimeter to receive the downward-extending leg portions of the spring clamp leads. After the tunable capacitor assembly is inserted into the upper housing member with the upper portion of the rotor post friction fitted into the top, base housing member is coated around its periphery with an epoxy glue and friction fitted into the base of the cylindrical upper housing member such that the bottom of the lower housing member is flush with the base of the cylindrical wall of the upper housing member. The epoxy is positioned to seal the spring clamp leads in their respective openings through the base member. The difference in diameters of the housing members also contributes to the tightness of the base seal. Thus, the tunable capacitor assembly is completely sealed within a strong, semi-rigid plastic housing having a recess at its top to permit the use of a tuning tool. All seals, whether friction fitted or friction fitted and glued are so tight that no moisture, dust or other contaminants can enter the housing and affect the tunable capacitor assembly.

DESCRIPTION OF THE PREFERRED EMBODIMENT

Figure 1:
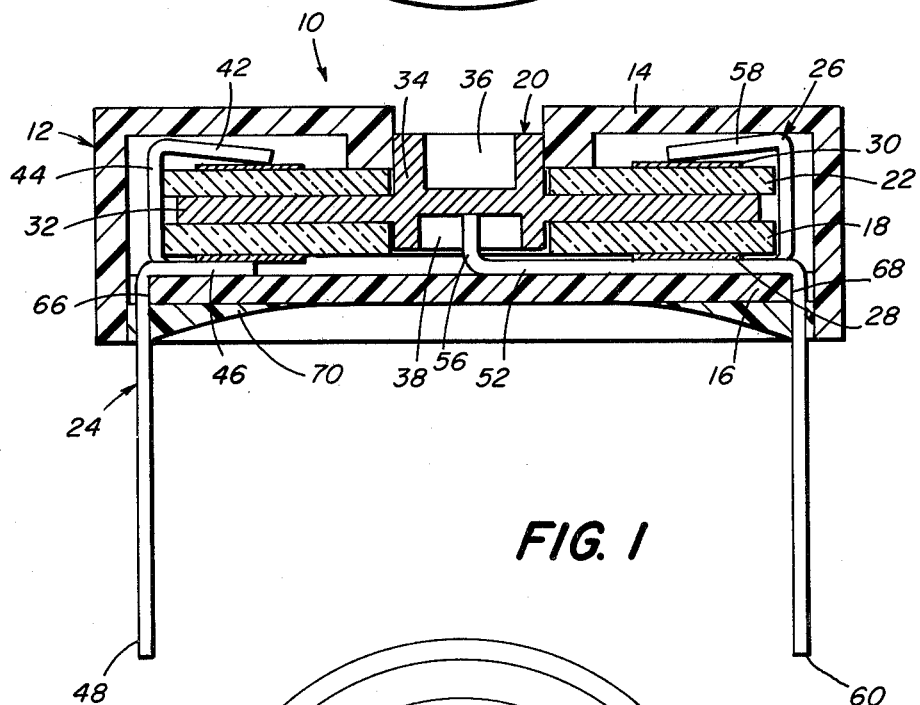
FIG. 1 is a vertical, composite cross-sectional view of the sealed tunable capacitor assembly of the present invention sealed within its plastic housing.

Referring now in detail to the drawings and in particular to FIG. 1, the sealed tunable capacitor of this invention is designated generally by the reference number 10. Sealed tunable capacitor 10 is comprised of a cylindrical insulated housing 12 having an upper housing portion 14 and a lower housing base 16. Both housing members 12, 14 are preferably fabricated from a tough semi-rigid plastic material such as Delrin (trademark). It should be understood that FIG. 1 is a composite cross-sectional view to show the components in their relationships. FIG. 1 is not taken along a single cross-sectional line.

The tunable capacitor assembly within housing 12 includes a first stator disc 18, a semi-circular rotor member 20, and a second stator disc 22 all retained in face to face stacked relationship in that order by formed metal spring clamps 24, 26. The underside of the first stator disc 18, which preferably will be fabricated from a ceramic dielectric material, is metallized with a semi-anular highly conductive metallic layer 28. Second stator disc 22 is similarly constructed except that its conductive layer 30 faces upward. The metallic stator layers 28, 30 may be patterned according to the particular requirements of the capacitor.

Rotor member 20, of a highly conductive metal, comprises a thin, semi-circular (or other shaped) plate portion 32 having a central, concentric cylindrical post portion 34, the upper end of which is provided with a square adjusting hole or recess 36. The lower end of rotor post portion 34 is formed with a concentric circular recess 38 for the purpose hereinafter described. The stator disc members 18, 22 are provided with round central openings for the sliding reception of the upper and lower rotor post 34 portions respectively upon assembly. The inner diameters of the conductive metallic stator layers 28, 30 are greater than the outer diameter of rotor post portion 34 so that the stator discs will remain electrically insulated from the rotor 20. A first spring clamp electrode 24 of a highly conductive material serves not only to resiliently clamp the disc-like parts of tunable capacitor 10 together but also to electrically interconnect the conductive layers 28, 30 together to act as a single electrical stator between which is sandwiched the semi-circular rotor plate 32. Spring clamp electrode 24 is formed with an upper clamp finger portion 42 extending horizontally inward as a bifurcated portion bent downwards, a downwardly extending vertical leg portion 44, a laterally extending base portion 46, and a downwardly extending, off-set vertical leg portion 48 which, upon assembly, is adapted to fit through a rectangular cut-away slot 66 in the perimeter of base housing member 16, all of which are integrally formed as one unit. The first spring clamp fingers 42 contact the second stator metallized conductive layer 30 and the horizontal base 46 contacts the first stator metallic layer 28 for electrical contact to vertical leg 48 which serves as the stator lead. First spring clamp fingers 42 press resiliently against second stator conductive layer 30 at a central position therealong. Since the laterally extending portion 46 of first spring clamp electrode 24 contacts first stator conductive layer 28, both stator conductive layers 28, 30 are electrically connected to first spring clamp electrode 24 which serves as a common stator connector terminal for sealed tunable capacitor 10.

Second spring clamp electrode 26, which is also highly conductive, serves also to resiliently clamp the disc-like parts of sealed tunable capacitor 10 together at a diametrically opposite side portion thereof and to make electrical connection with rotor 20. Second spring clamp electrode 26 is formed with a transversely extending flat base portion 52 integrally formed with a pair of inwardly extending spring fingers (not shown) terminating in an upwardly extending contact 56 adapted to project upwardly and outwardly into rotor post recess 38 to make electrical contact therewith. The outer end of flat base portion 52 is integrally formed with upwardly off-set, downwardly bent spring finger portions 58 which converge to hold the disc-like parts together against the corresponding portion of base 52. All these parts of second spring clamp electrode 26 are also integrally formed with a central downwardly extending leg portion 60 which is adapted to fit through rectangular cut-away slot 68 in the perimeter of housing base member 16, which slot is diametrically opposed to slot 66 for the first spring clamp member 24. Both slots are illustrated in FIG. 2.

The square hole 36 in the upper rotor post 34 provides for the use of a screw driver-like dielectric tool having a bit of complementary square cross-sectional shape for turning said rotor 20 with respect to the rest of the capacitor assembly and thereby varying or adjusting capacitance as the rotor plate 32 is moved in relation to the fixed stator layers 28, 30. First and second spring clamp leg portions 48, 60 are utilized as connector terminals.

Figure 3:
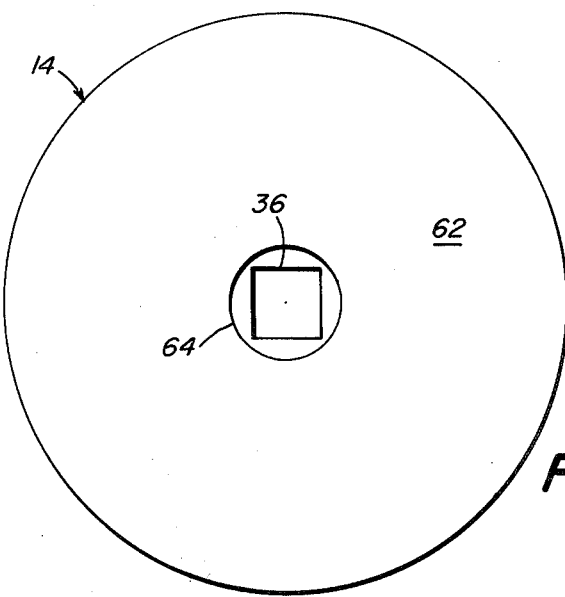
FIG. 3 is a top view of the housing of FIG. 1.

FIG. 1 further illustrates housing 12 of sealed tunable capacitor 10. Upper housing member 14 is of generally cylindrical shape having side walls and a top and is preferably fabricated from a semi-rigid plastic such as Delrin (trademark). Lower housing base member 16 is made of the same material. After the capacitor unit has been assembled as described above it is inserted within upper housing member 14. As illustrated in FIG. 3, the top 62 of upper housing member 14 has a centrally disposed circular opening 64 having a diameter slightly less than the outside diameter of upper rotor post 34. In the assembly of sealed tunable capacitor 10, the top of rotor post 34 is friction-fitted within opening 64 such that it is slightly recessed within housing top 62 and is tightly sealed therein. This friction fitting makes possible access to tuning recess 36 from the exterior of housing 12 without breaking or otherwise impairing the seal.

Figure 2:
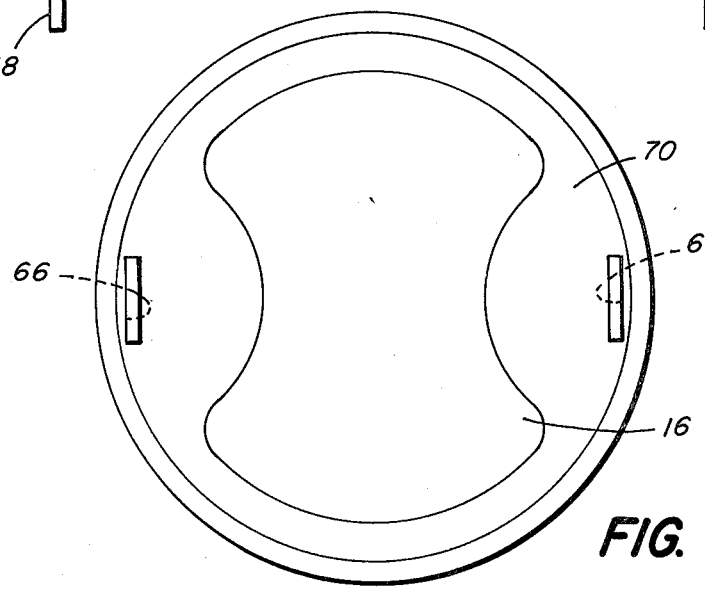
FIG. 2 is a top view of the interior side of the base member of the housing of FIG. 1 showing the area covered by the epoxy used to seal the bottom of the housing.

Base housing member 16, illustrated in FIG. 2, has an outside diameter slightly greater than the inside diameter of upper housing member 14 such that base housing member 16 may be friction fitted within upper housing member 14 to form the base of sealed tunable capacitor 10 as illustrated in FIG. 1. Base housing member 16 further includes two diametrically opposed rectangular slots 66, 68 to receive the vertical leg contacts 48, 60 of first and second spring clamp members 24, 26 respectively. Base housing member 16 is further sealed to upper housing member 14 and the capacitor by a coating 70 of an epoxy glue, such as a nylon-bodied calcium chloride-ethanol, to ensure an air, moisture and dust tight seal. The contour of the base epoxy seal 70 is illustrated in FIG. 1, where it is shown as a miniscus near the periphery of the assembly, and the approximate epoxy sealed area on the top of housing member 16 is shown in FIG. 2.

Thus, housing 12 provides a completely sealed housing for a tunable capacitor assembly with complete protection against the undesired entry of any contaminant.

While I have illustrated and described herein only one embodiment of my invention, it is to be understood that this is given by way of example only and not in a limiting sense. The invention, in brief, comprises all the embodiments and modifications coming within the scope and spirit of the following claims.

I claim:

1. A sealed tunable disc capacitor comprising:
   a tunable capacitor assembly comprising:
   a pair of outer dielectric discs;
   a central electrically conductive rotor interposed between said outer discs in face-to-face stacked relation;
   the ouside of each of said outer discs having an electrically conductive portion in spaced parallel registration with one another;
   spring clamp means for retaining said outer dielectric discs in mutually substantially fixed relation and in face-to-face stacked relation with respect to said rotor;
   said rotor comprising a flat segmental rotor plate portion and means constraining said rotor to co-axial rotative movement with respect to said dielectric discs;
   said spring clamp means comprising an electrically conductive first spring clamp electrode having a base portion electrically and mechanically connected with the electrically conductive portion of one of said dielectric discs and a clamp finger portion electrically and mechanically connected with the electrically conductive portion of the other of said discs;
   said spring clamp means further comprising a second electrically conductive spring clamp electrode having contact means abutting a central portion of said rotor through a central opening in one of said dielectric discs and spring finger means overlying and abutting outer surface portions of the other of said dielectric discs at a zone thereof removed from said electrically conductive portion thereof;
   a central opening in the other of said dielectric discs;
   said rotor being integrally formed with a central post portion having a first axially outwardly-extending portion rotatively journaled in said opening in said one of said dielectric discs and a second axially outwardly-extending portion rotatively journaled in said opening of the other of said dielectric discs;
   a recess in the outer end of one of said outwardly extending portions of said rotor post portion, said recess comprising means for sliding interengagement of an adjustment tool having a bit of conforming cross-sectional shape;
   a sealed housing for said capacitor assembly comprising:
   an upper housing member having a generally cylindrical shape including a top and circular side wall;
   a circular opening in said top of said upper housing member of a diameter slightly less than the outside diameter of said rotor post portion, such that one end of said rotor post portion may be frictionally fitted within said opening and recessed within said top to form a friction sealing of said rotor post portion within said upper housing member top, permitting access to said rotor post recess capable of receiving said adjustment tool;
   a base housing member to seal said capacitor assembly within said upper housing member, said base housing member having an outside diameter slightly greater than the inside diameter of said upper housing member such that said base housing member may be friction-fitted within said upper housing member;
   said base housing member having two diametrically opposed rectangular slots at its periphery to receive the contact leads of said spring clamp members in sealed engagement therewith;
   said housing members being fabricated of a semi-rigid, non-conductive plastic material to permit the friction-fitting sealing of said capacitor assembly within said housing.

2. The sealed tunable capacitor of claim 1 further including:
   a coating of an epoxy adhesive on the side and top of said base housing member to further seal said housing against the penetration of contaminants.

3. The sealed tunable capacitor of claim 2 wherein said epoxy adhesive is a nylon-bodied calcium chloride-ethanol.

4. The sealed tunable capacitor of claim 1 wherein said contact leads are sealed in said rectangular slots by frictional engagement therewith.

5. The sealed tunable capacitor of claim 1 wherein said contact leads are sealed in said rectangular slots by said epoxy adhesive.

6. The sealed tunable capacitor of claim 1 wherein said contact leads are sealed in said rectangular slots by frictional engagement therewith and by said epoxy adhesive.

* * * * *